(12) United States Patent
De Bock et al.

(10) Patent No.: US 9,373,984 B2
(45) Date of Patent: Jun. 21, 2016

(54) ELECTRICAL MACHINE

(75) Inventors: Hendrik Pieter Jacobus De Bock, Clifton Park, NY (US); James Pellegrino Alexander, Ballston Lake, NY (US); Ayman Mohamed Fawzi El-Refaie, Niskayuna, NY (US); William Dwight Gerstler, Niskayuna, NY (US); Manoj Ramprasad Shah, Latham, NY (US); Xiaochun Shen, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 248 days.

(21) Appl. No.: 13/171,583

(22) Filed: Jun. 29, 2011

(65) Prior Publication Data

US 2013/0002064 A1 Jan. 3, 2013

(51) Int. Cl.
*H02K 1/32* (2006.01)
*H02K 9/19* (2006.01)
*H02K 9/197* (2006.01)
*H02K 5/20* (2006.01)

(52) U.S. Cl.
CPC .. *H02K 1/32* (2013.01); *H02K 9/19* (2013.01); *H02K 9/197* (2013.01); *H02K 5/20* (2013.01)

(58) Field of Classification Search
CPC ........... H02K 1/32; H02K 1/19; H02K 1/193; H02K 1/197; H02K 5/20; H02K 9/19
USPC ........................ 310/52, 54, 59, 61–63; 464/17
See application file for complete search history.

(56) References Cited

U.S. PATENT DOCUMENTS

| | | | | |
|---|---|---|---|---|
| 2,706,260 A | * | 4/1955 | Heintz | 310/54 |
| 2,894,155 A | * | 7/1959 | Labastie | 310/54 |
| 3,648,085 A | * | 3/1972 | Fujii | 310/54 |
| 4,203,044 A | * | 5/1980 | Linscott, Jr. | 310/61 |
| 4,322,030 A | | 3/1982 | Jacobson et al. | |
| 4,621,210 A | | 11/1986 | Krinickas, Jr. | |
| 5,509,381 A | | 4/1996 | Fisher | |
| 6,897,581 B2 | * | 5/2005 | Doherty et al. | 310/52 |

(Continued)

FOREIGN PATENT DOCUMENTS

| | | | | |
|---|---|---|---|---|
| CN | 101953052 A | | 1/2011 | |
| DE | EP 0824287 | * | 2/1998 | ............. H02K 9/197 |

(Continued)

OTHER PUBLICATIONS

W. Yang et al., "Spray Cooling of Air-Cooled Compact Heat Exchangers," International Journal Heat and Mass Transfer, vol. 18, No. 2, Jun. 21, 1974, pp. 311-317.

(Continued)

*Primary Examiner* — Burton Mullins
(74) *Attorney, Agent, or Firm* — Jason K. Klindtworth

(57) ABSTRACT

An apparatus, such as an electrical machine, is provided. The apparatus can include a rotor defining a rotor bore and a conduit disposed in and extending axially along the rotor bore. The conduit can have an annular conduit body defining a plurality of orifices disposed axially along the conduit and extending through the conduit body. The rotor can have an inner wall that at least partially defines the rotor bore. The orifices can extend through the conduit body along respective orifice directions, and the rotor and conduit can be configured to provide a line of sight along the orifice direction from the respective orifices to the inner wall.

16 Claims, 15 Drawing Sheets

(56) References Cited

U.S. PATENT DOCUMENTS

| | | |
|---|---|---|
| 7,462,962 B2 | 12/2008 | De Bock et al. |
| 7,476,994 B2 * | 1/2009 | Birdi et al. .................. 310/61 |
| 7,579,725 B2 | 8/2009 | Zhou et al. |
| 7,597,537 B2 | 10/2009 | Bucaro et al. |
| 7,886,991 B2 | 2/2011 | Zuo et al. |
| 7,952,240 B2 | 5/2011 | Takenaka et al. |
| 2002/0105238 A1 * | 8/2002 | Radomile et al. ............ 310/61 |
| 2004/0066098 A1 | 4/2004 | Doherty et al. |
| 2008/0253907 A1 * | 10/2008 | Lind .......................... 417/354 |
| 2010/0231067 A1 * | 9/2010 | Ruffing et al. ............... 310/61 |
| 2010/0264759 A1 * | 10/2010 | Shafer et al. ................ 310/54 |
| 2010/0289386 A1 * | 11/2010 | Gerstler ............. H02K 1/2773 310/60 A |
| 2011/0148229 A1 * | 6/2011 | Esse ........................... 310/54 |
| 2012/0104884 A1 * | 5/2012 | Wagner et al. .............. 310/54 |

FOREIGN PATENT DOCUMENTS

| | | | |
|---|---|---|---|
| EP | 0824287 | * 2/1998 | ............ H02K 9/197 |
| EP | 1892512 | * 2/2008 | ............... G01L 3/22 |
| EP | 2254221 A2 | 11/2010 | |
| GB | 1514087 A | 6/1978 | |

OTHER PUBLICATIONS

EP Search Report and Written Opinion dated Mar. 19, 2014 issued in connection with corresponding EP Patent Application No. 12173688.8.

Unofficial English Translation of Chinese Office Action issued in connection with corresponding CN Application No. 201210336220.2 on Aug. 24, 2015.

* cited by examiner

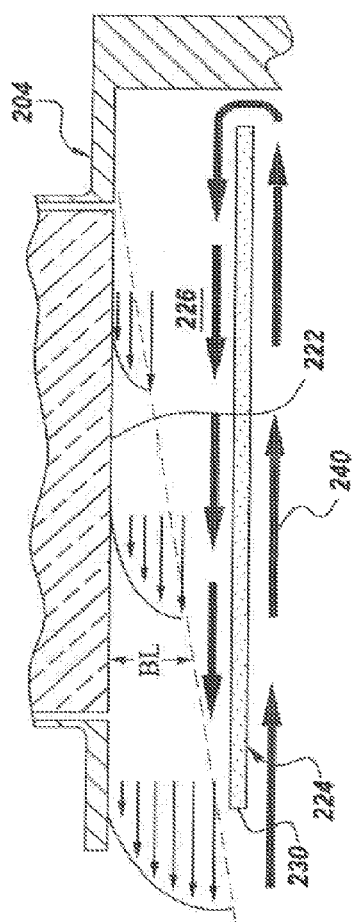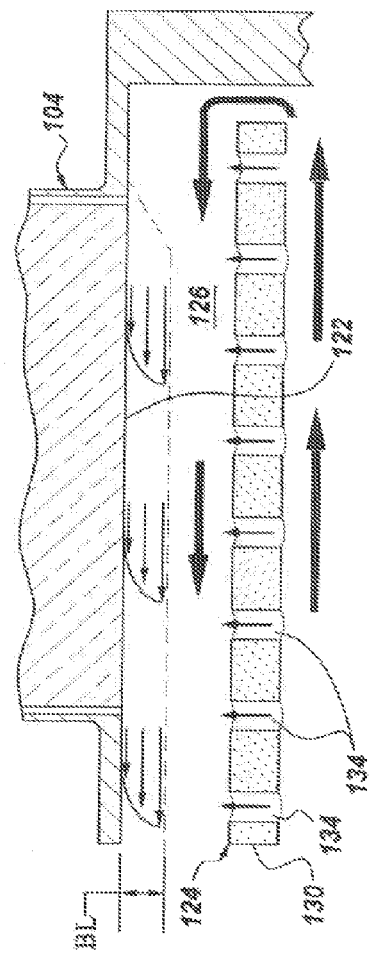

ELECTRICAL MACHINE

STATEMENT REGARDING FEDERALLY SPONSORED RESEARCH & DEVELOPMENT

This invention was made with Government support under contract number DE-FC26-07NT43122 awarded by the United States Department of Energy. The Government has certain rights in the invention.

BACKGROUND

Embodiments presented herein generally relate to electrical machines and, in particular, to thermal energy management in electrical machines.

Rotating electric machines, such as generators and motors, conventionally employ a rotor section, which rotates and includes one or more (electro- or permanent) magnet assemblies, and a stator section, which often surrounds the rotor section and includes a series of conductive windings. Depending on whether the electric machine is a generator or a motor, electric current in the conductive windings will either be induced by or cause rotation of the rotor section. In either case, due to the current in the stator windings and the resistance thereof, thermal energy will be produced, with the amount of thermal energy generated in the stator section being roughly proportional to the amount of power an electric machine generates (for generator application) or delivers (for power motor application). For high power density rotating electric machines, if the thermal energy is not sufficiently removed, the temperature in the stator section can exceed the material limits electrical insulation and/or other materials within the stator section.

In advanced electric machine applications, the demand for power has been constantly increasing while the desirable machine size has been constantly decreasing. An electrical machine that meets these two conditions generally has high power density and very demanding cooling requirements.

BRIEF DESCRIPTION

According to one aspect, an apparatus, such as an electrical machine, is provided. The apparatus can include a rotor defining a rotor bore and a conduit disposed in and extending axially along the rotor bore. The conduit can include an inlet portion that is configured to receive fluid and to direct the fluid into the conduit. The rotor can be configured to rotate relative to the conduit.

The conduit can have an annular conduit body defining a plurality of orifices disposed axially along, and, in some cases, circumferentially around, the conduit. The orifices can extend through the conduit body (e.g., extending radially through the conduit body, in a direction with a component transverse to an axial direction of the rotor). Some orifices may extend along respectively different directions through said conduit body. Some orifices may have respectively different opening areas. The conduit body can define at least one orifice so as to be configured as a spray nozzle and/or a spray nozzle can be disposed over at least one of the orifices. The spray nozzle, whether defined by or disposed over the orifices, can be configured to atomize liquid being forced therethrough.

The rotor can have an inner wall that at least partially defines the rotor bore. The orifices can extend through the conduit body along respective orifice directions, and the rotor and conduit can be configured to provide a line of sight along the orifice direction from the respective orifices to the inner wall.

In another aspect, an apparatus, such as an electrical machine, is provided. The apparatus can include a stator and a rotor disposed concentrically with the stator, the rotor defining a rotor bore. A conduit can be disposed in and extend axially along the rotor bore. The conduit can have an annular conduit body that defines a plurality of orifices disposed axially along the conduit and extending through the conduit body. A coolant fluid can move along the conduit in a first axial direction and along an inner wall of the rotor in a second axial direction opposing the first axial direction.

DRAWINGS

FIG. 9 is a schematic view of the section labeled "9" of the electrical machine of FIG. 8, showing the boundary layer developed during operation.

FIG. 10 is a schematic view of the section labeled "10" of the electrical machine of FIG. 7, showing the boundary layer developed during operation.

DETAILED DESCRIPTION

Figure 1:
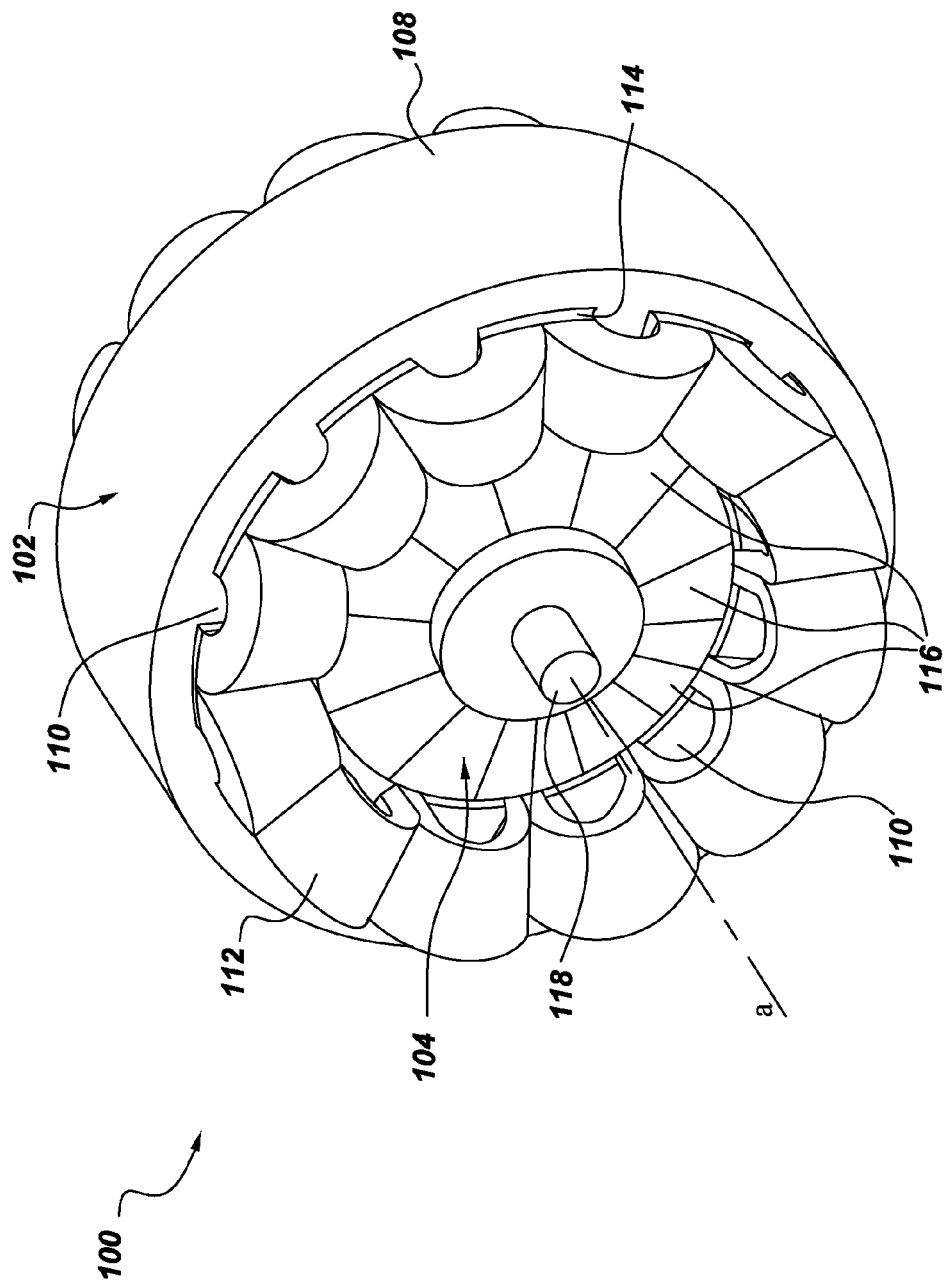
FIG. 1 is a perspective view of a portion of an electrical machine.

Example embodiments are described below in detail with reference to the accompanying drawings, where the same reference numerals denote the same parts throughout the drawings. Some of these embodiments may address the above and other needs.

Figure 2:
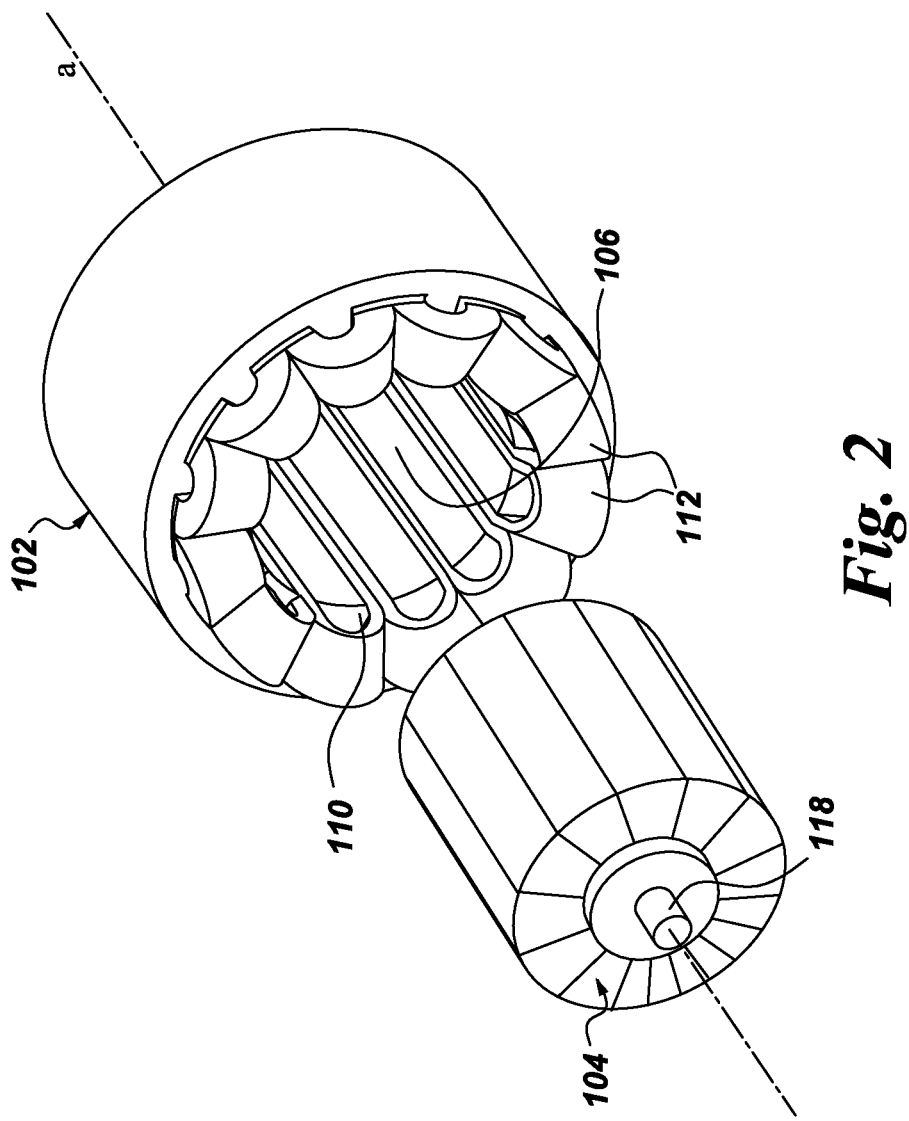
FIG. 2 is a perspective exploded view of the electrical machine of FIG. 1.
Figure 3:
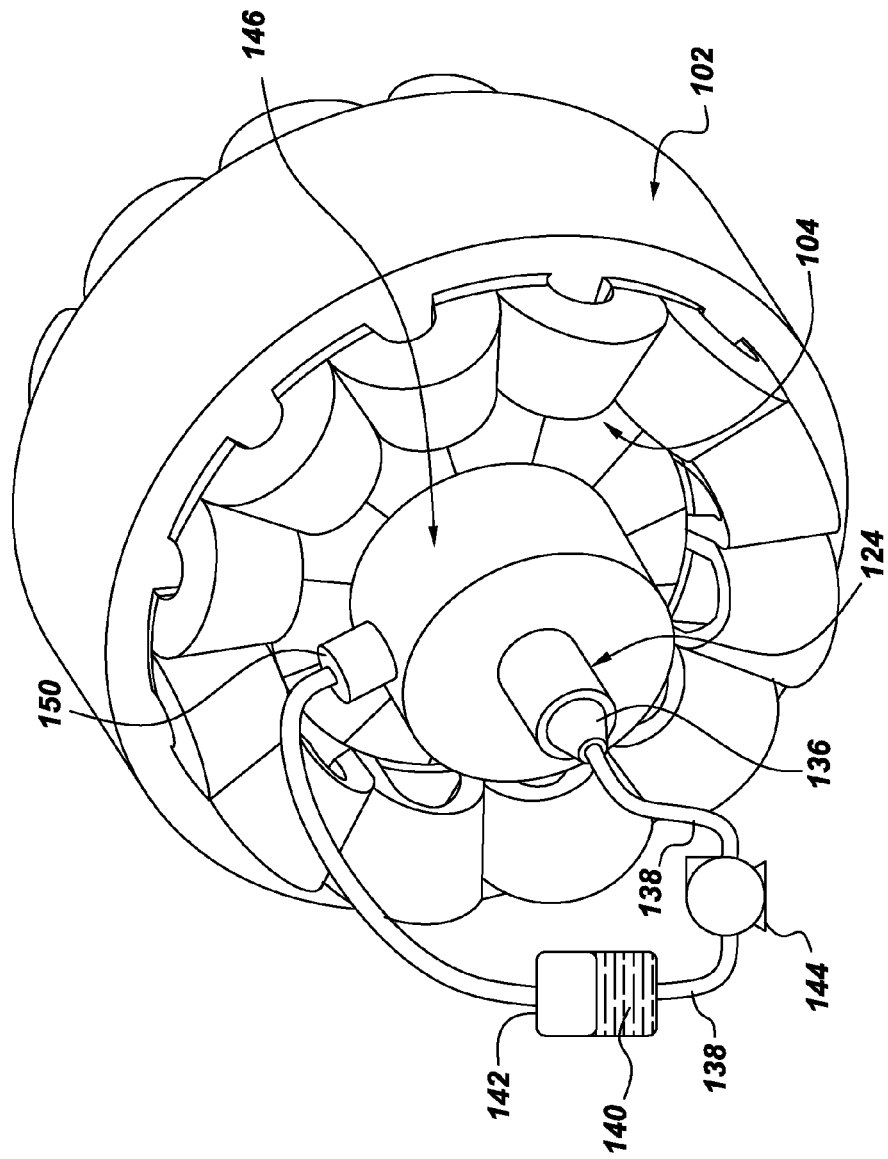
FIG. 3 is a perspective view of the electrical machine of FIG. 1, the view taken from an opposing angle with respect to FIG. 1.
Figure 4:
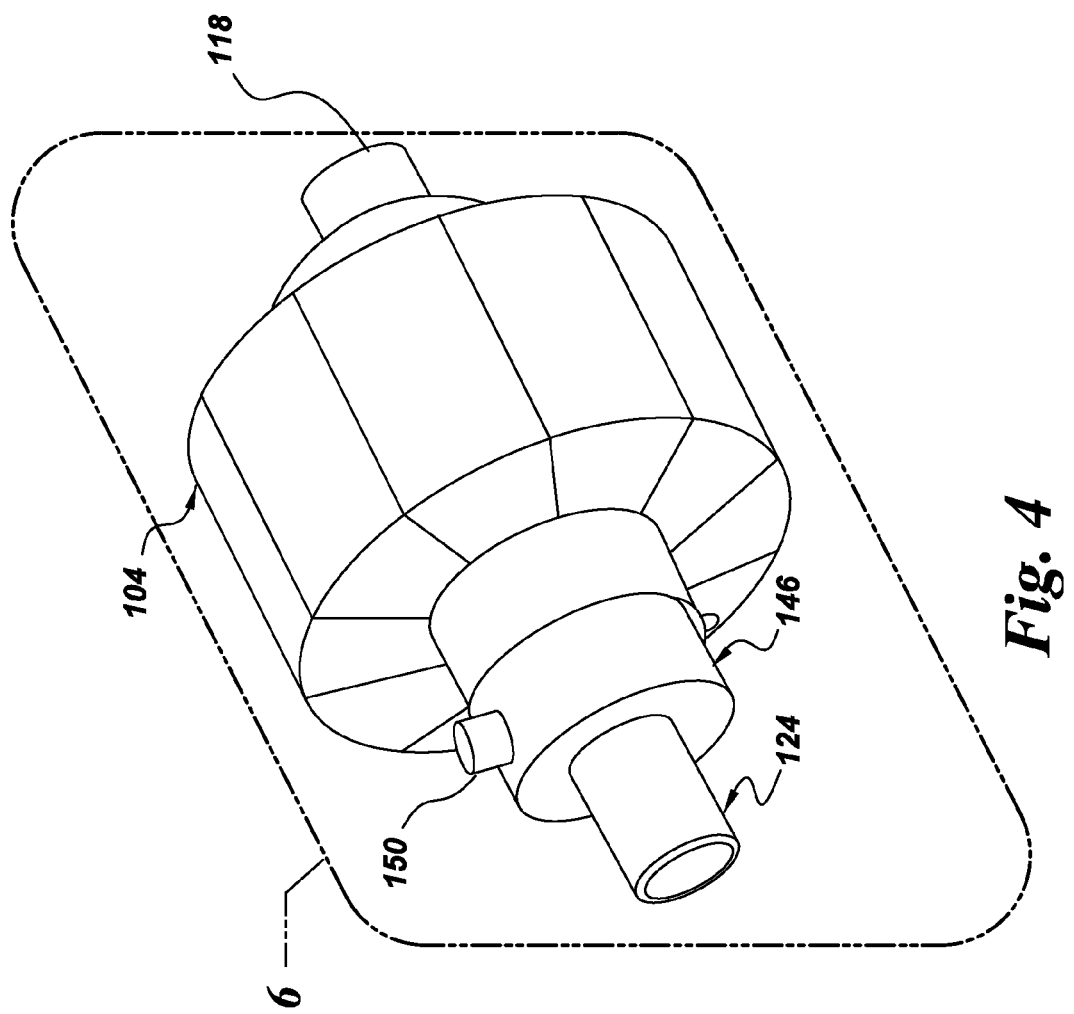
FIG. 4 is a perspective view of a portion of the electrical machine of FIG. 3.
Figure 5:
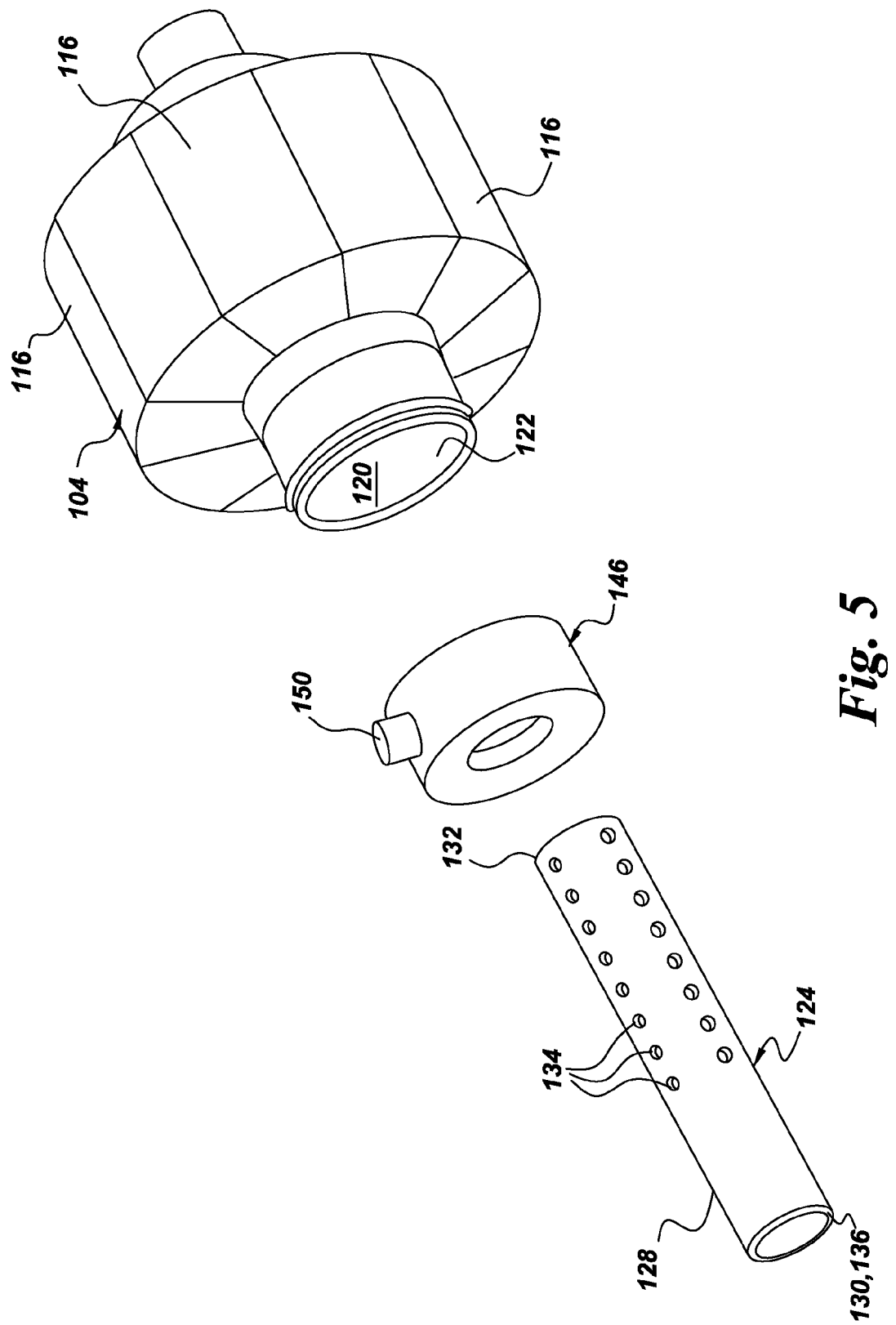
FIG. 5 is an exploded view of the components of FIG. 4.

Referring to FIGS. 1 and 2, therein are shown views of a portion of an apparatus, such as an electrical machine 100 (such as an electric motor or generator). The electrical machine 100 can include a substantially concentrically disposed stator 102 and rotor 104. For example, the stator 102 can define a stator bore 106 within which the rotor 104 can be disposed. The stator bore 106 and the rotor 104 may be substantially cylindrical, and may be elongated so as to define an axis a.

The stator section may include an outer casing 108 (sometimes referred to as the "back iron" or "yoke"), and one or more teeth 110 each extending, say, radially inward from the outer casing. Conductive windings 112 can be wound around respective teeth 110. Insulation 114 can be included so as to provide electrical isolation between the outer casing 108/teeth 110 and the conductive windings 112. The rotor 104 may include one or more magnets 116 (e.g., electromagnets and/or permanent magnets). The rotor 104 can be coupled to a shaft 118 that is configured to rotate about the axis a.

During operation of the electrical machine 100, the shaft 118 and rotor 104 rotate about the axis a. Depending on whether the electrical machine 100 is a generator or a motor, electric current in the conductive windings 112, interacting with magnetic fields associated with the magnets 116, will either be induced by or cause rotation of the rotor 104. In the former case, work done on the shaft 118 can induce rotation of the shaft and rotor 104 and current flow in the windings 112, while in the latter, current injected into the windings can cause rotation of the rotor and shaft. In either case, thermal energy may be produced in the electrical machine 100, thereby causing an increase in temperature of the rotor 104.

Referring to FIGS. 3-6, the rotor 104 can define a rotor bore 120 that extends, for example, along the axis a. For example, the rotor 104 can include an inner wall 122 that at least partially defines the rotor bore 120. A conduit 124 can be disposed in, and extend axially along, the rotor bore 120, such that a gap 126 is defined between the conduit and the inner wall 122. The conduit 124 can have an annular conduit body 128 of either constant or varying diameter, with a proximal end 130 and a distal end 132. The conduit body 128 can define a plurality of orifices 134 that are disposed axially along the conduit 124 and extending, say, radially, through the conduit body. The orifices 134 may also be disposed circumferentially around the conduit body 128, for example, so as to form an array of orifices through the conduit 124. The proximal end 130 of the conduit 124 can form an inlet portion 136 that is configured to receive fluid and to direct the fluid into the conduit. For example, the inlet portion 136 can include a fitting that facilitates fluid communication between the conduit 124 and a supply line 138 for supplying fluid, such as a liquid coolant 140, to the conduit (say, from a liquid coolant source 142). A pump 144 can be included to urge liquid coolant 140 through the supply line 138 to the conduit 124.

The conduit 124 may be configured such that the rotor 104 rotates relative to the conduit. An outlet portion 146 can act to fluidly seal to the relatively rotating conduit 124 and rotor 104. For example, the outlet portion 146 can be bonded to the conduit 124, and may include a seal 148, such as a contact seal, labyrinth seal, or brush seal, to seal to the rotating rotor 104. The outlet portion 146 can also include one or more egresses 150 that facilitate fluid communication between the gap 126 and one or more outlet lines 138 for directing fluid, such as a liquid coolant 140, to a liquid coolant collection area, which may be the same as the liquid coolant source 142.

Figure 7:
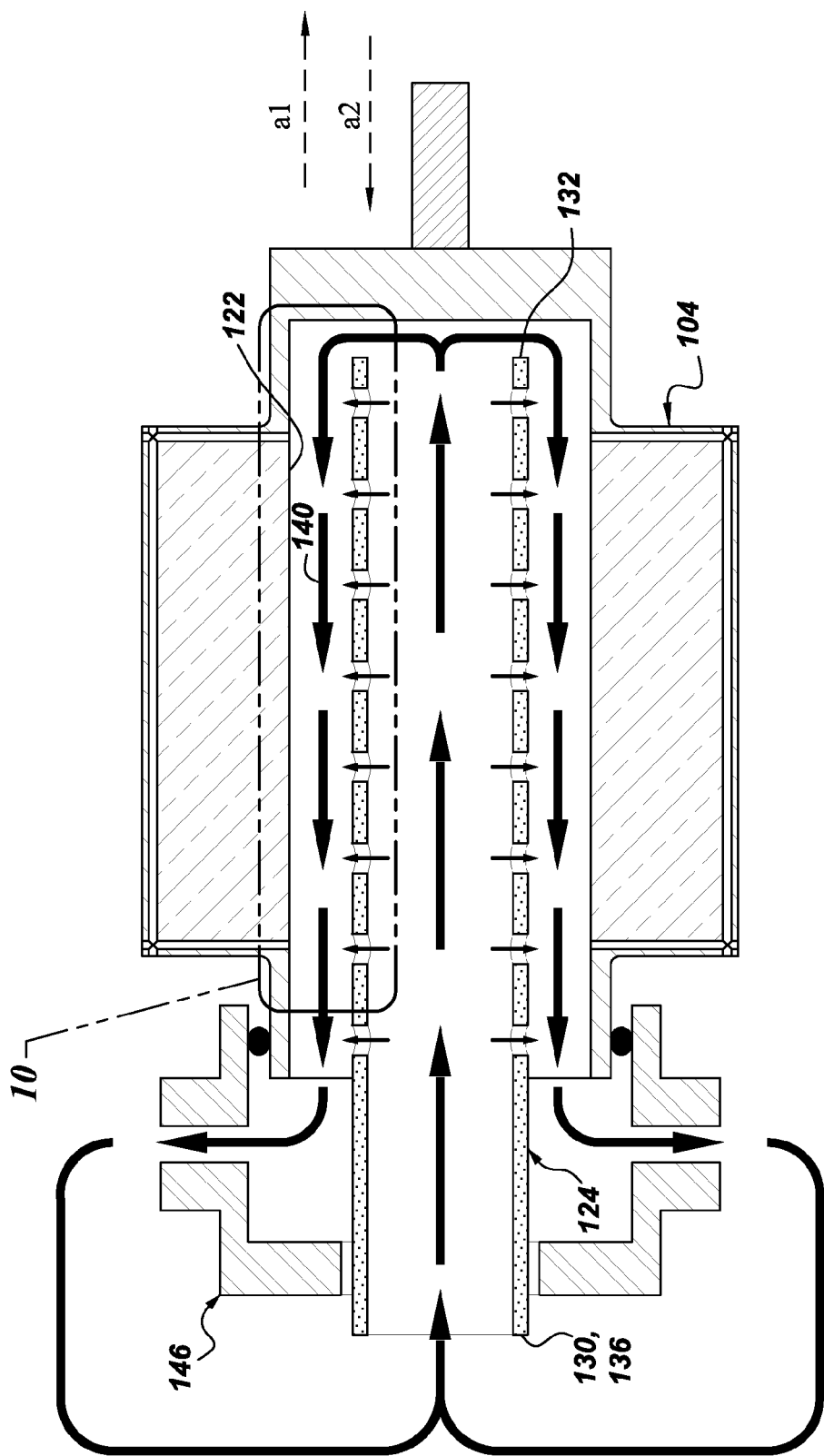
FIG. 7 shows the system of FIG. 6 during operation.

Referring to FIG. 7, in operation, coolant fluid (e.g., liquid coolant 140) can be urged along the conduit 124 in a first axial direction a1 (generally defined by the conduit). That is, the liquid coolant 140 in the conduit 124 may, on average, generally flow in the direction a1, although the average velocity of the liquid coolant may not be directed exactly along a1, and specific portions of the liquid coolant may flow in directions that differ significantly from a1 (for example, portions of liquid coolant disposed in the conduit and in close proximity to an orifice 134). Some amount of liquid coolant 140 can flow out of the distal end 132 of the conduit 124 and into the gap 126, while other portions of the liquid coolant may respectively flow out of the orifices 134 and into the gap. The liquid coolant 140 in the gap 126 can flow along the inner wall 122 of the rotor 104 (and may flow through the gap in areas away from the inner wall, such that the liquid coolant substantially or completely fills the gap) in a second axial direction a2 that generally opposes the first axial direction a1.

As the liquid coolant 140 flows through the gap 126, it can absorb thermal energy. The liquid coolant 140 eventually reaches the outlet portion 146, at which point the liquid coolant may pass through the egresses 150, thereby transporting away from the rotor 104 the thermal energy absorbed therein. In some cases, the liquid coolant 140 can be returned from the outlet portion 146 to the inlet portion 136, say, after passing the liquid coolant through the pump 144 and a heat exchanger (not shown), such that the liquid coolant follows a fluid circuit.

Figure 8:
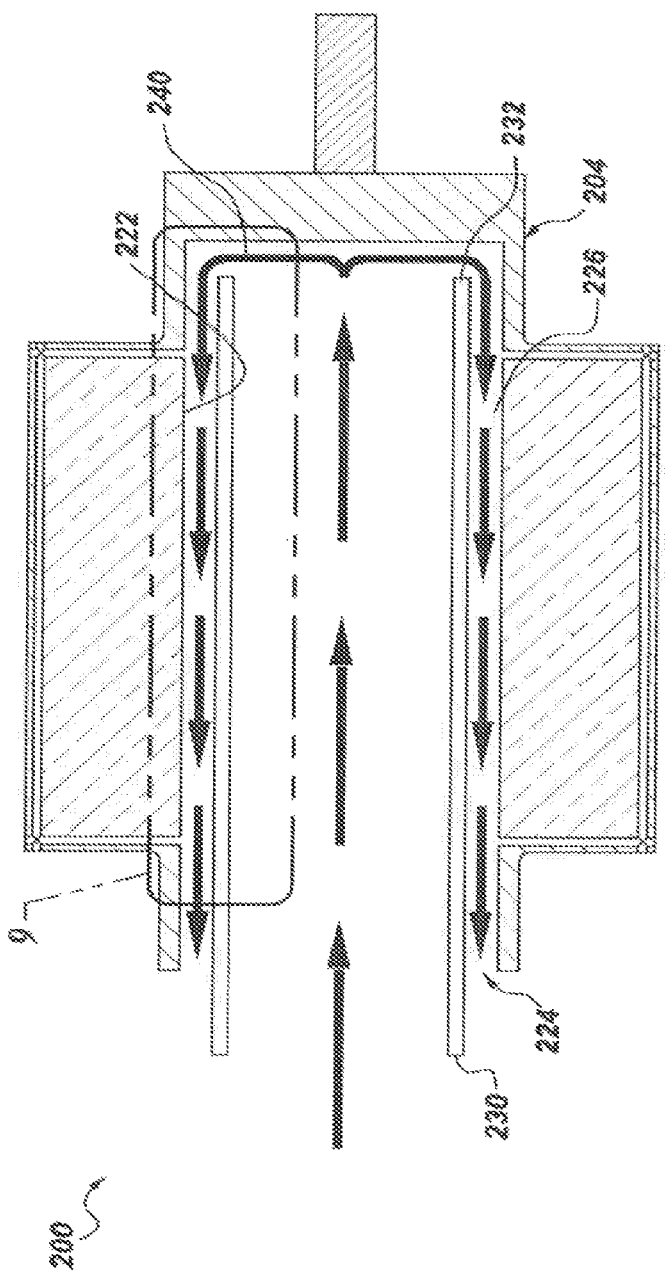
FIG. 8 is a cross-sectional view of a conventional electrical machine.

Electrical machines configured in accordance with the electrical machine 100 may exhibit enhanced thermal performance relative to a conventional electrical machine, such as the electrical machine 200 represented in FIG. 8. The electrical machine 200 includes a rotor 204 coupled to a shaft 218 that is configured to rotate about an axis a. The rotor 204 includes an inner wall 222 that defines an axial rotor bore 220. A conduit 224 having a proximal end 230 and a distal end 232 is disposed in the rotor bore 220, such that a gap 226 is defined between the conduit and the inner wall 222. In operation, liquid coolant 240 may be flowed through the conduit 224 in a first direction from the proximal end 230 to the distal end 232. The liquid coolant 240 can flow out of the distal end 232 of the conduit 224 and then along the gap 226 in a second direction that substantially opposes the first direction.

As the liquid coolant 240 flows along the inner wall 222/gap 226 in the second direction, the liquid coolant continues to absorb thermal energy. As a result, the temperature of the liquid coolant 240 increases from that at the distal end 232 to that at the proximal end 230. Additionally, considering the fluid velocity profile of the liquid coolant 240 flowing through the gap 226, a boundary layer BL will form due to the presence of, for example, the inner wall 222. As shown schematically in FIG. 9, as the liquid coolant 240 flows along the inner wall 222 from the distal end 232 to the proximal end 230, the thickness of the boundary layer BL increases in thickness. The widening of the boundary layer results in reduced heat transfer performance between the wall 222 and the liquid coolant 240, reducing the effectiveness of the liquid coolant in removing thermal energy from the rotor 204.

Figure 6:
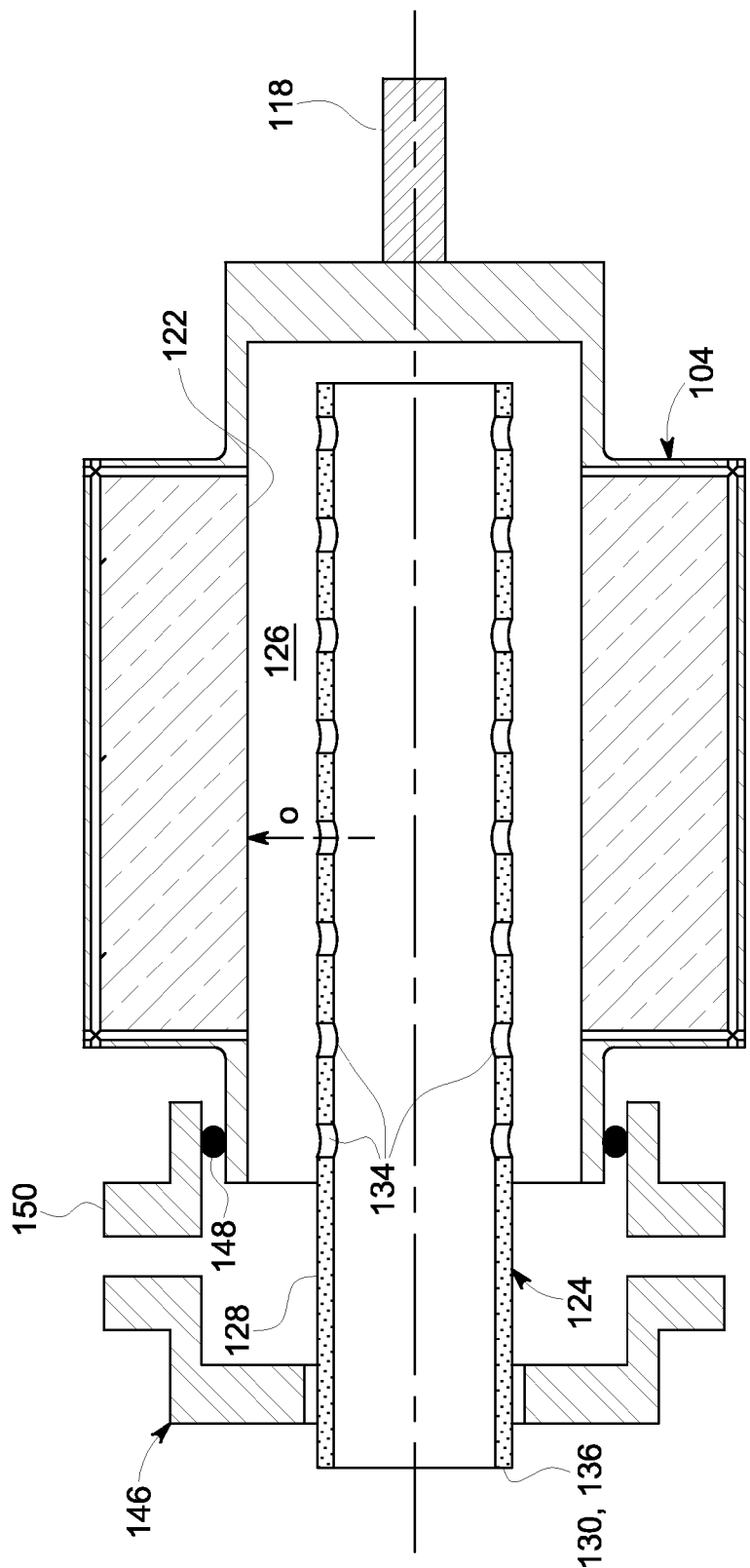
FIG. 6 is a cross-sectional view of the components of FIG. 4, taken along the plane labeled "6" in FIG. 4.
Figure 11:
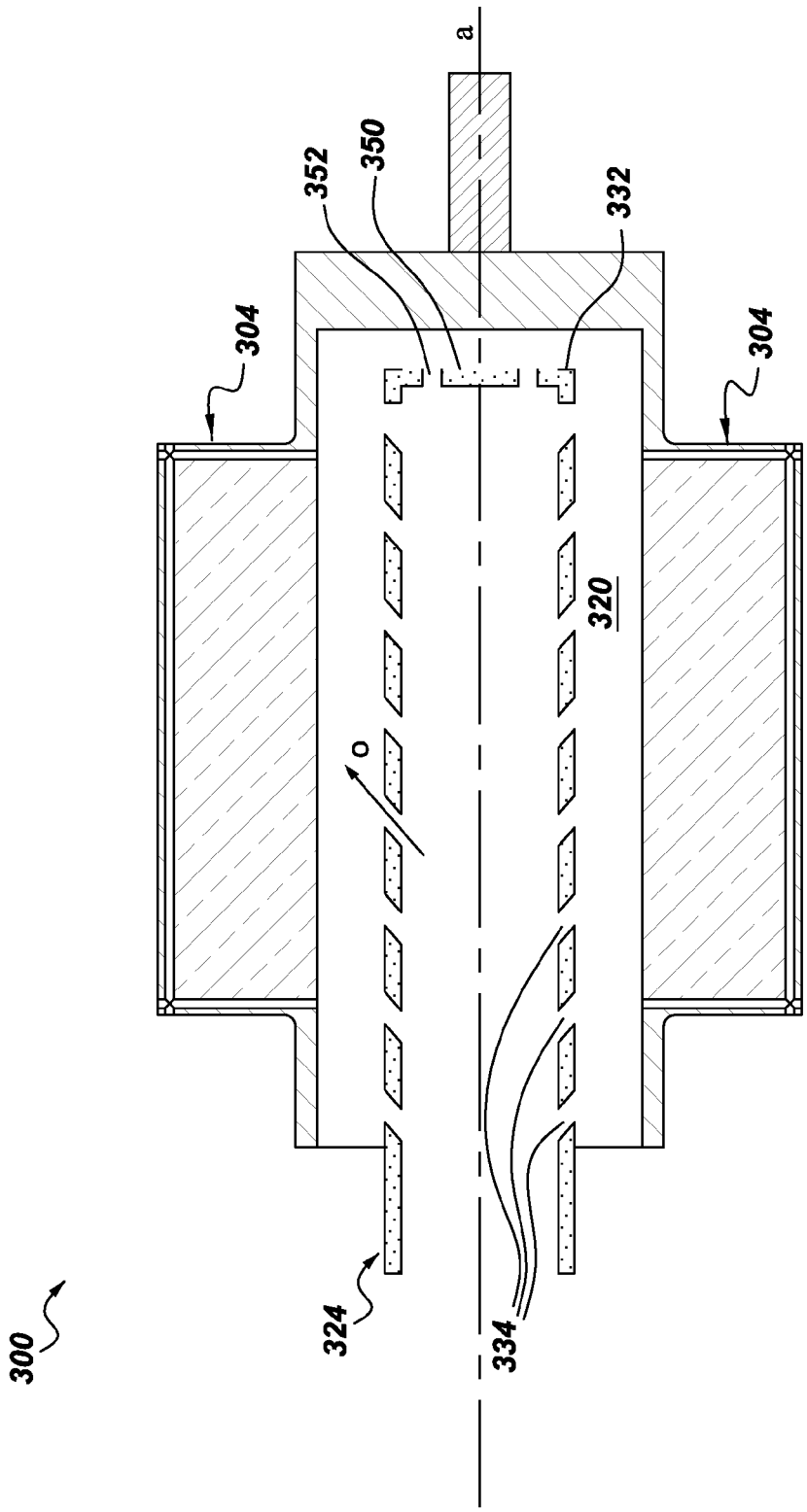
FIGS. 11-16 are cross-sectional views of electrical machines configured in accordance with other example embodiments.

Referring to FIGS. 6, 7, and 10, the electrical machine 100 can include a conduit having a plurality of orifices 134 disposed axially therealong. Liquid coolant 140 can therefore be injected into the gap 126 at a variety of locations along the length of the rotor 104. The liquid coolant 140 may therefore provide more uniform cooling along the length of the rotor 104. Further, the injected liquid coolant 140 can act to disrupt the boundary layer BL at a variety of locations along the length of the rotor 104, such that the thickness of the boundary layer is reduced and the average velocity of the liquid coolant (and the efficiency of the associated heat transfer) may be increased. Along these lines, as the orifices 134 can extend through the conduit body 128 along respective orifice directions O (see, for example, FIGS. 6 and 11), the rotor 104 and conduit 124 can be configured to provide a line of sight along the orifice direction from one or more of the respective orifices to the inner wall 122. This may facilitate disruption of the boundary layer by the flow of liquid coolant 140 through the orifices 134.

Figure 12:
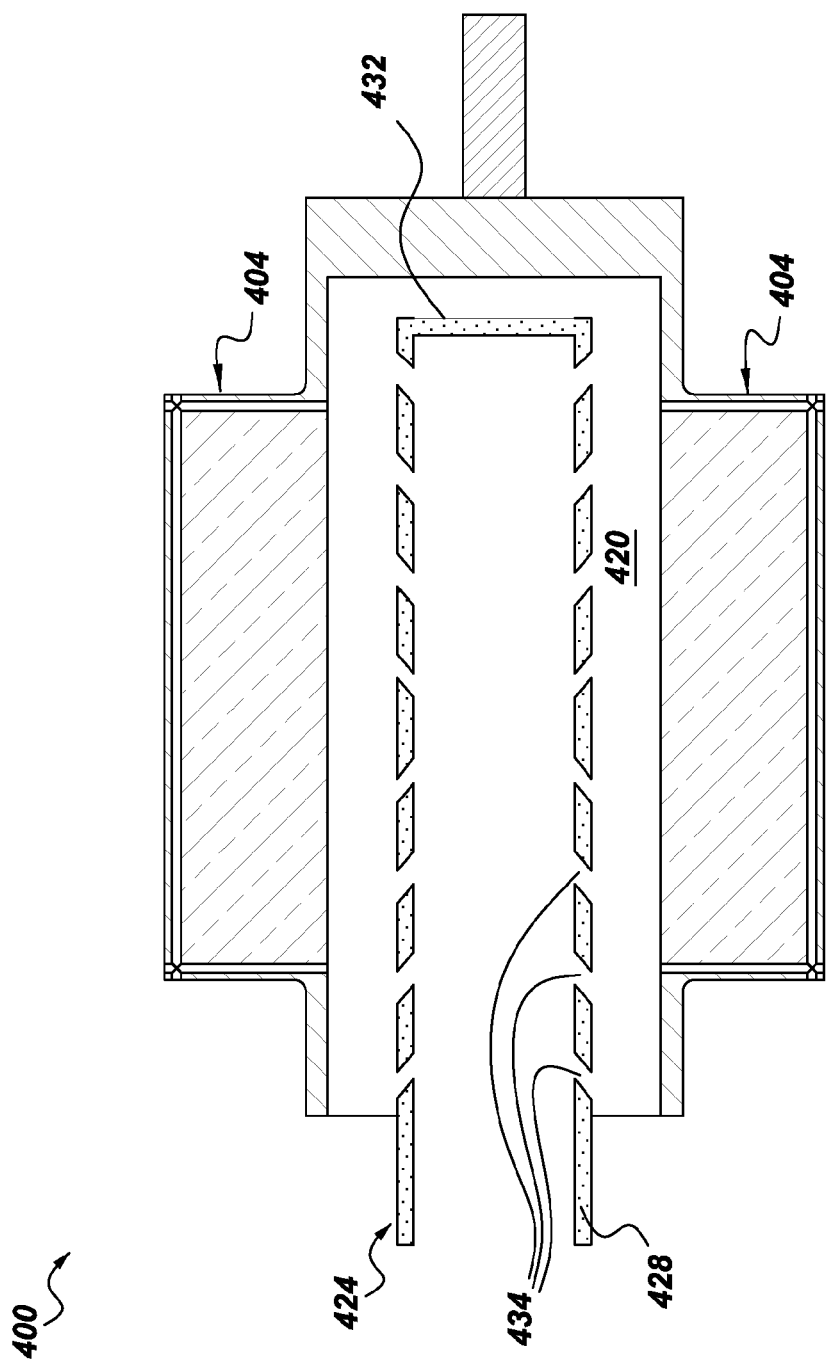
Figure 13:
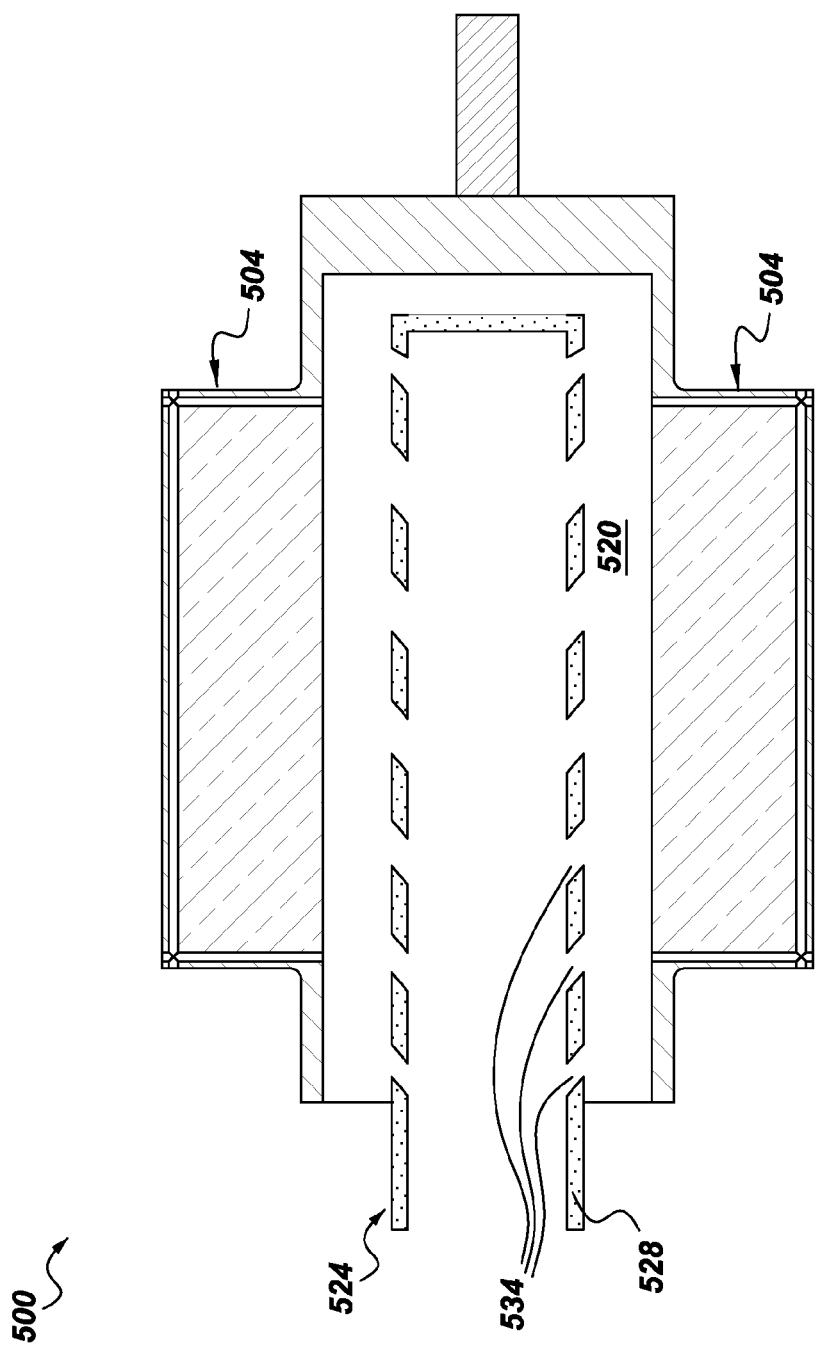

The orifices along the conduit can assume a variety of configurations in order to affect different flow patterns of the cooling fluid. For example, referring to FIG. 11, therein is shown a portion of an electrical machine 300 configured in accordance with another embodiment. The machine 300 can include a rotor 304 and a conduit 324 disposed in a rotor bore 320. The conduit 324 can define orifices 334 that extend in a direction with a component transverse to an axial direction a of the rotor 304. The orifices 334 may also extend in a direction having a component parallel to the direction a, such that the orifices form an angle relative to the rotor axis a. The conduit 324 can be closed at the distal end 332 by a cap 350 that defines orifices 352 therethrough. Referring to FIG. 12, in another embodiment, an electrical machine 400 can include a conduit 424 disposed in a rotor bore 420 of a rotor 404, and the conduit 424 can include a conduit body 428 that define orifices 434 that extend along respectively different directions through the conduit body. The conduit 424 can be closed at the distal end 432. Referring to FIG. 13, in yet another embodiment, an electrical machine 500 can include a conduit 524 that defines orifices 534, some of which orifices have respectively different opening areas (e.g., the area as measured transverse to the direction in which the orifice extends through the conduit).

Figure 14:
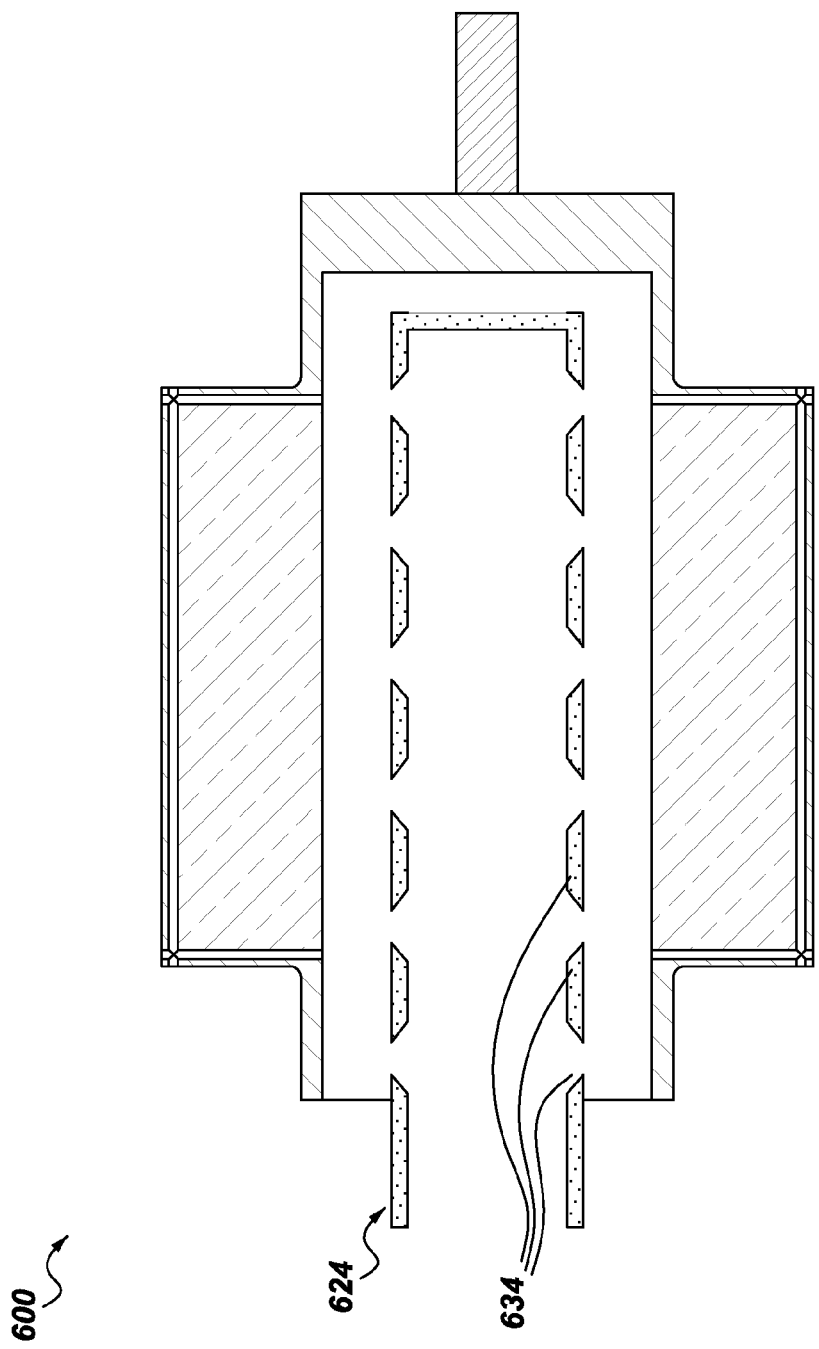
Figure 15:
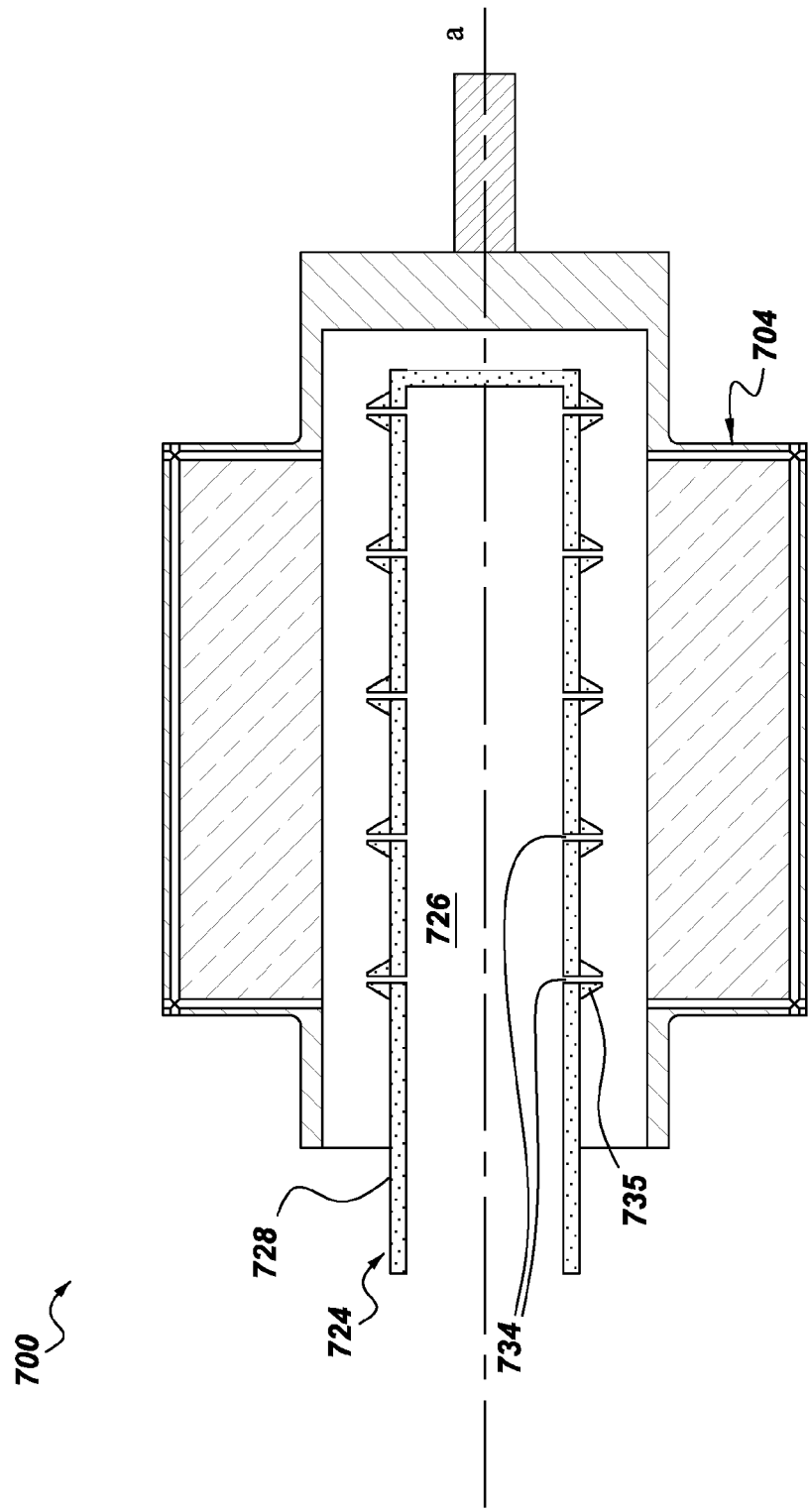

Referring to FIG. 14, in still another embodiment, an electrical machine 600 can include a conduit 624 that defines orifices 634 that have diameters that vary through the thickness of the conduit. For example, the orifices 634 may have a convergent or conical profile so as to be configured as spray nozzles. Alternatively, referring to FIG. 15, a conduit 724 can include orifices 734 with a substantially straight profile, and discrete spray nozzles 735 can be disposed over one or more of the orifices.

In cases where liquid coolant does not completely fill the gap between the conduit 624, 724 and a surrounding rotor 604, 704, the spray nozzles 634, 735 may be configured to atomize or otherwise mist liquid being forced therethrough, which may enhance the efficiency of heat transfer to the liquid coolant. Further, with a proper fluid choice for the liquid coolant (e.g., oil, such as transmission oil, water, ethylene glycol, and/or combinations thereof), two-phase cooling may be effected, whereby the liquid coolant impinging on a heated surface evaporates, and the latent heat of vaporization is utilized to enhance the removal of thermal energy. In such case, the energy associated with inducing acceleration of the coolant will be reduced, hence increasing the efficiency of the machine.

Figure 16:
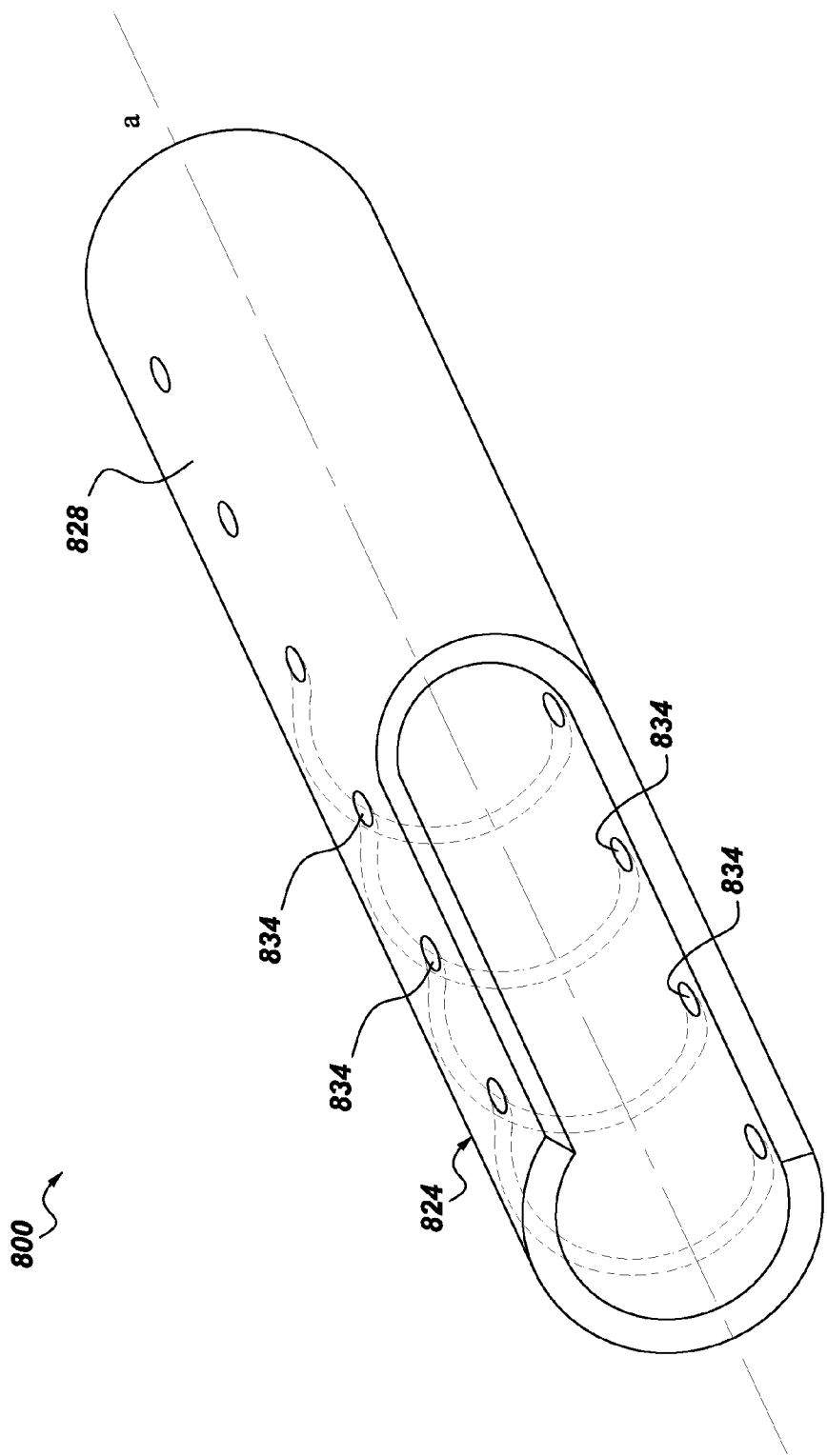

Referring to FIG. 16, in one embodiment, a conduit 824 may include orifices 834 extend through the conduit body 828 in a direction that has a component oriented circumferentially to an axis a defined by the conduit. By orienting the orifices 834 somewhat circumferentially, cooling fluid urged therethrough may be imparted with angular momentum, which may reduce the energy losses associated with churning of the cooling fluid as it flows through the conduit and then reverses direction to flow out from a surrounding rotor.

While only certain features of the invention have been illustrated and described herein, many modifications and changes will occur to those skilled in the art. For example, referring to FIGS. 1-7, while the conduit 124 has been generally depicted as being linear in shape and uniform in diameter, in some embodiments, the conduit may be curved and/or may have a diameter that increases, decreases, or otherwise varies along the length of the conduit. Further, while the orifices 134 have been generally depicted as being uniformly spaced along the length of the conduit 124, in some embodiments, the orifices may be non-uniformly spaced, for example, being more densely grouped in areas of highest temperature. It is, therefore, to be understood that the appended claims are intended to cover all such modifications and changes as fall within the true spirit of the invention.

What is claimed:

1. An apparatus comprising:
   a rotor defining a rotor bore with an inner wall;
   a conduit comprising an open first end for receiving and directing fluids into said conduit and further comprising an open second end, said conduit having a portion disposed in and extending axially along said rotor bore, said conduit having an annular conduit body defining a gap between said inner wall and said portion of said conduit disposed in said rotor bore, said gap being in direct fluid communication with said open second end;
   a coolant fluid that enters the apparatus through said open first end and moves along said conduit in a first axial direction towards and around said open second end and into said gap, said coolant fluid moving along said gap of said rotor in a second axial direction opposing said first axial direction; and
   a plurality of orifices formed on said portion disposed within said rotor bore axially along said conduit and extending through said conduit body into said gap, said orifices being operative to divert a coolant fluid portion moving in said first axial direction and inject said coolant fluid portion into said coolant fluid moving in said second axial direction, wherein at least two of the orifices have respectively different opening areas.

2. The apparatus of claim 1, wherein the orifices are disposed circumferentially around said conduit body.

3. The apparatus of claim 1, wherein at least two of the orifices extend along respectively different directions through said conduit body.

4. The apparatus of claim 1, wherein the orifices extend through said conduit body along respective orifice directions, and wherein said rotor and conduit are configured to provide a line of sight along the orifice direction from the respective orifices to said inner wall.

5. The apparatus of claim 1, wherein said rotor is configured to rotate relative to said conduit.

6. The apparatus of claim 1, further comprising said coolant fluid portion being operative to disrupt boundary layers within the gap.

7. An apparatus comprising:
   a rotor defining a rotor bore with an inner wall;
   a conduit comprising an open first end for receiving and directing fluids into said conduit and further comprising an open second end, said conduit having a portion disposed in and extending axially along said rotor bore, said conduit having an annular conduit body defining a gap between said inner wall and said portion of said conduit disposed in said rotor bore, said gap being in direct fluid communication with said open second end;
   a coolant fluid that enters the apparatus through said open first end and moves along said conduit in a first axial direction towards and around said open second end and into said gap, said coolant fluid moving along said gap of said rotor in a second axial direction opposing said first axial direction; and
   a plurality of orifices formed on said portion disposed within said rotor bore axially along said conduit and extending through said conduit body into said gap, said orifices being operative to divert a coolant fluid portion moving in said first axial direction and inject said coolant fluid portion into said coolant fluid moving in said second axial direction, and
   a spray nozzle, defined by or disposed over at least one orifice.

8. The apparatus of claim 7, wherein said spray nozzle is configured to atomize liquid being forced therethrough.

9. An apparatus comprising:
   a stator;
   a rotor disposed concentrically with said stator and defining a rotor bore with an inner wall;
   a conduit comprising an open first end for receiving and directing fluids into said conduit and further comprising an open second end, said conduit having a portion disposed in and extending axially along said rotor bore, said conduit having an annular conduit body defining a gap between said inner wall and said portion of said conduit disposed in said rotor bore, said gap being in direct fluid communication with said open second end;

a coolant fluid that enters the apparatus through said open first end and moves along said conduit in a first axial direction towards and around said open second end and into said gap, said coolant fluid moving along said gap of said rotor in a second axial direction opposing said first axial direction; and a plurality of orifices formed on said portion disposed within said rotor bore axially along said conduit and extending through said conduit body into said gap, said orifices being operative to divert a coolant fluid portion moving in said first axial direction and inject said coolant fluid portion into said coolant fluid moving in said second axial direction, wherein at least two of the orifices have respectively different opening areas.

10. The apparatus of claim 9, wherein the orifices are disposed circumferentially around said conduit body.

11. The apparatus of claim 9, wherein at least two of the orifices extend along respectively different directions through said conduit body.

12. The apparatus of claim 9, wherein the orifices extend through said conduit body along respective orifice directions, and wherein said rotor and conduit are configured to provide a line of sight along the orifice direction from the respective orifices to said inner wall.

13. The apparatus of claim 9, wherein said rotor is configured to rotate relative to said conduit.

14. The apparatus of claim 9, further comprising said coolant fluid portion being operative to disrupt boundary layers within the gap.

15. An apparatus comprising:
a stator;
a rotor disposed concentrically with said stator and defining a rotor bore with an inner wall;
a conduit comprising an open first end for receiving and directing fluids into said conduit and further comprising an open second end, said conduit having a portion disposed in and extending axially along said rotor bore, said conduit having an annular conduit body defining a gap between said inner wall and said portion of said conduit disposed in said rotor bore, said gap being in direct fluid communication with said open second end;
a coolant fluid that enters the apparatus through said open first end and moves along said conduit in a first axial direction towards and around said open second end and into said gap, said coolant fluid moving along said gap of said rotor in a second axial direction opposing said first axial direction;
a plurality of orifices formed on said portion disposed within said rotor bore axially along said conduit and extending through said conduit body into said gap, said orifices being operative to divert a coolant fluid portion moving in said first axial direction and inject said coolant fluid portion into said coolant fluid moving in said second axial direction; and
a spray nozzle, defined by or disposed over at least one orifice.

16. The apparatus of claim 15, wherein said spray nozzle is configured to atomize liquid being forced therethrough.

* * * * *